US011223971B2

(12) United States Patent
    Mori

(10) Patent No.: US 11,223,971 B2
(45) Date of Patent: Jan. 11, 2022

(54) COMMUNICATION CONTROL DEVICE, COMMUNICATION CONTROL METHOD, AND COMPUTER READABLE MEDIUM

(71) Applicant: MITSUBISHI ELECTRIC CORPORATION, Tokyo (JP)

(72) Inventor: Ikumi Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 80 days.

(21) Appl. No.: 16/763,781

(22) PCT Filed: Jan. 19, 2018

(86) PCT No.: PCT/JP2018/001675
§ 371 (c)(1),
(2) Date: May 13, 2020

(87) PCT Pub. No.: WO2019/142337
PCT Pub. Date: Jul. 25, 2019

(65) Prior Publication Data
US 2020/0374747 A1    Nov. 26, 2020

(51) Int. Cl.
*H04W 28/02* (2009.01)
*H04W 72/10* (2009.01)

(52) U.S. Cl.
CPC ... *H04W 28/0289* (2013.01); *H04W 28/0226* (2013.01); *H04W 28/0242* (2013.01); *H04W 28/0284* (2013.01); *H04W 72/10* (2013.01)

(58) Field of Classification Search
CPC ....... H04L 47/125; H04L 47/24; H04L 47/28; H04W 28/021; H04W 28/0226; H04W 28/0242; H04W 28/0284; H04W 28/0289; H04W 72/10
See application file for complete search history.

(56) References Cited

U.S. PATENT DOCUMENTS 5,892,946 A  *  4/1999  Woster ................... G06F 9/465
                                                     719/316
10,091,368 B2 * 10/2018  Kadota ................. G06F 3/1287
(Continued)

FOREIGN PATENT DOCUMENTS

JP        8-340345 A      12/1996
JP       11-112565 A       4/1999
(Continued)

OTHER PUBLICATIONS

International Search Report for PCT/JP2018/001675 dated Apr. 10, 2018.

*Primary Examiner* — Kashif Siddiqui
(74) *Attorney, Agent, or Firm* — Birch, Stewart, Kolasch & Birch, LLP

(57) ABSTRACT

Deterioration of the quality of service at an application level is minimized by performing communication control only when the density of mobile objects (11) in a management network is high. A communication control device (100) is installed in each of mobile objects (11) that acquire content data (141) from a content server (14). The mobile objects (11) constitute a management network for communicating with each other. A management unit (110) determines whether communication control when acquiring the content data (141) is to be performed, based on the density of the mobile objects (141) in the management network.

18 Claims, 11 Drawing Sheets

(56) References Cited

U.S. PATENT DOCUMENTS

| | | | |
|---|---|---|---|
| 2002/0167920 | A1 | 11/2002 | Miyazaki et al. |
| 2006/0056382 | A1 | 3/2006 | Yamada et al. |
| 2006/0168126 | A1 | 7/2006 | Costa-Requena et al. |
| 2008/0240322 | A1 | 10/2008 | Date |
| 2009/0119455 | A1 | 5/2009 | Kisel et al. |
| 2009/0296674 | A1* | 12/2009 | Eki ................. H04W 8/005 370/338 |
| 2015/0189065 | A1* | 7/2015 | Li .................. H04W 28/0231 455/414.1 |
| 2017/0019495 | A1 | 1/2017 | Bennis et al. |
| 2017/0201456 | A1* | 7/2017 | Siow ............... H04W 28/0289 |

FOREIGN PATENT DOCUMENTS

| | | |
|---|---|---|
| JP | 2001-244939 A | 9/2001 |
| JP | 2005-33548 A | 2/2005 |
| JP | 2005-202618 A | 7/2005 |
| JP | 2005-292872 A | 10/2005 |
| JP | 2006-101477 A | 4/2006 |
| JP | 2008-92524 A | 4/2008 |
| JP | 2008-524736 A | 7/2008 |
| JP | 2008-258756 A | 10/2008 |
| JP | 2010-186450 A | 8/2010 |
| JP | 2011-501588 A | 1/2011 |
| JP | 2011-44930 A | 3/2011 |
| JP | 2012-105161 A | 5/2012 |
| JP | 2015-216504 A | 12/2015 |
| JP | 2017-511641 A | 4/2017 |

\* cited by examiner

511: COMMUNICATION MANAGEMENT TABLE

| PRIORITY | WAITING TIME | MAXIMUM COMMUNICATION TIME |
|---|---|---|
| 1 | X1 | Y1 |
| 2 | X2 | Y2 |
| ... | ... | ... |
| n | Xn | Yn |

515  516  517

SPECIFIC EXAMPLE

| AMOUNT OF PRE-FETCHED DATA B (MB) | PRIORITY | WAITING TIME (MILLISECONDS) | MAXIMUM COMMUNICATION TIME (MILLISECONDS) |
|---|---|---|---|
| 3 < B | 1 | 400 | 100 |
| 2 < B ≦ 3 | 2 | 300 | 200 |
| 1 < B ≦ 2 | 3 | 200 | 300 |
| 0 < B ≦ 1 | 4 | 100 | 400 |
| B ≦ 0 | 5 | 0 | 500 |

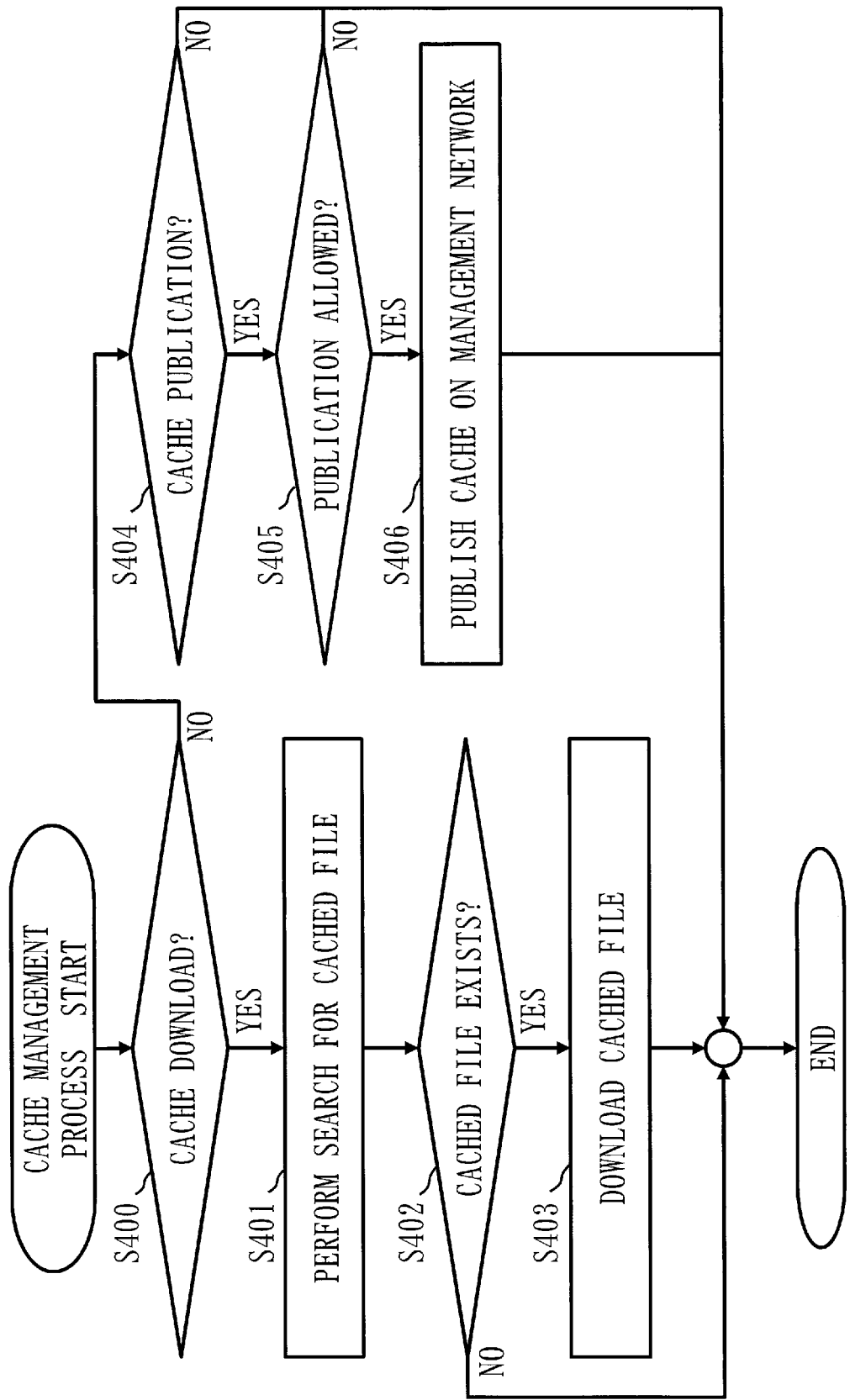

COMMUNICATION CONTROL DEVICE, COMMUNICATION CONTROL METHOD, AND COMPUTER READABLE MEDIUM

TECHNICAL FIELD

The present invention relates to a communication control device, a communication control method, and a communication control program.

BACKGROUND ART

Patent Literature 1 discloses a data delivery system for mobile objects. Patent Literature 1 discloses the data delivery system in which a transmitting terminal acquires reception statuses of receiving terminals via a communication network, and delivery operation is controlled based on the reception statuses. In this data delivery system, the packet drop rate is used for prioritization in delivery.

CITATION LIST

Patent Literature

Patent Literature 1: JP 2005-033548 A

SUMMARY OF INVENTION

Technical Problem

The data delivery system for mobile objects of Patent Literature 1 needs to collect reception statuses constantly. For this reason, a communication control process is performed even in a situation in which communication control is not necessary. As a result, the overhead associated with the control is high. If the number of receiving terminals increases, the load may concentrate on the transmitting terminal and the quality of service may deteriorate.

The present invention provides a communication control device that adjusts transmission timings between mobile objects only when the density of mobile objects requiring communication control is high. It is an object of the present invention to minimize deterioration of the quality of service at an application level by this communication control device.

Solution to Problem

A communication control device according to the present invention is installed in each of mobile objects that constitute a management network for communicating with each other, the mobile objects acquiring content data from a content server, and the communication control device includes a management unit to determine whether communication control when acquiring the content data is to be performed, based on a density of the mobile objects in the management network.

Advantageous Effects of Invention

A communication control device according to the present invention is installed in a mobile object. A management unit determines whether communication control when acquiring content data is to be performed, based on the density of mobile objects in a management network. Therefore, in the communication control device according to the present invention, the communication control is performed only when the density of mobile objects is high, so that deterioration of the quality of service at an application level can be minimized.

BRIEF DESCRIPTION OF DRAWINGS

FIG. 11 is a flowchart of a cache management process according to the second embodiment.

DESCRIPTION OF EMBODIMENTS

Figure 1:
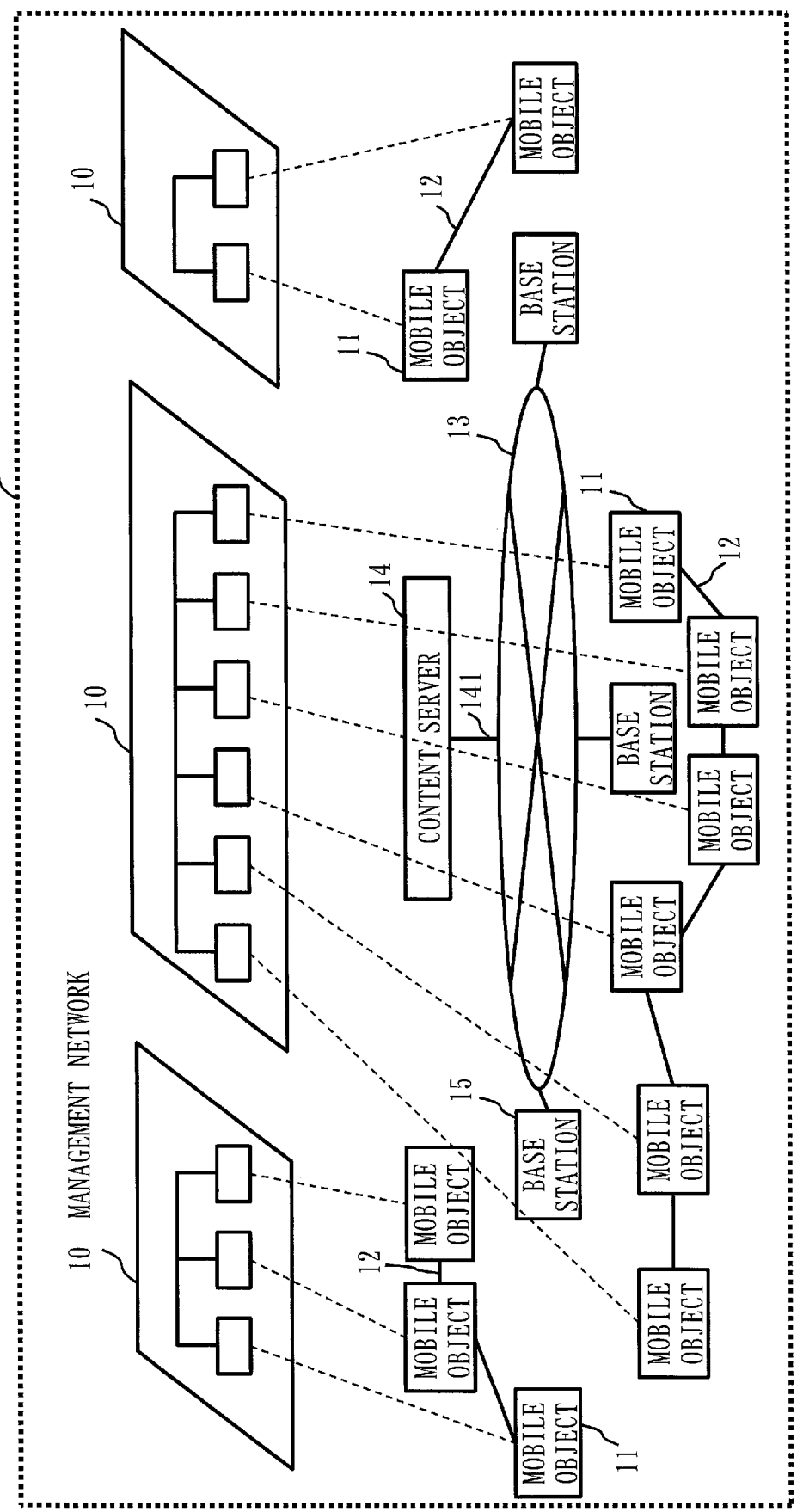
FIG. 1 is a conceptual diagram of a communication control system according to a first embodiment.

Embodiments of the present invention will be described hereinafter with reference to the drawings. Note that in the drawings, the same or corresponding portions are denoted by the same reference sings. In the description of the embodiments, description of the same or corresponding portions will be suitably simplified or omitted.

First Embodiment

*Description of Configuration*

The concept of a communication control system 500 according to this embodiment will be described with reference to FIG. 1.

The communication control system 500 has mobile objects 11. Each mobile object 11 of the mobile objects 11 acquires content data 141 from a content server 14. A communication control device 100 is installed in each mobile object 11 of the mobile objects 11.

A management network 10 is composed of mobile objects 11. The management network 10 is a logical network configured using a technology such as peer-to-peer (P2P) for exchanging control data necessary for communication control between the mobile objects 11. A physical network that constitutes the management network 10 is an ad hoc network 12.

The ad hoc network 12 is a network composed of the mobile objects 11 that are temporarily interconnected using a relay function of the mobile objects 11.

The mobile objects 11 also communicate with a base station 15 in order to acquire content data from the content server 14 provided on a wide area network 13.

The wide area network 13 refers to a network such as the Internet, a public network, or a dedicated network.

The content server 14 is an existing server that delivers content data 141 such as video, HyperText Markup Language (HTML) documents, or programs.

The base station 15 is a connection point such as a mobile phone base station or a wide area wireless local area network (LAN) access point. The base station 15 is the first connection point for the mobile objects 11 for acquiring content data 141.

A configuration of the communication control device 100 according to this embodiment will be described with reference to FIG. 2.

Figure 2:
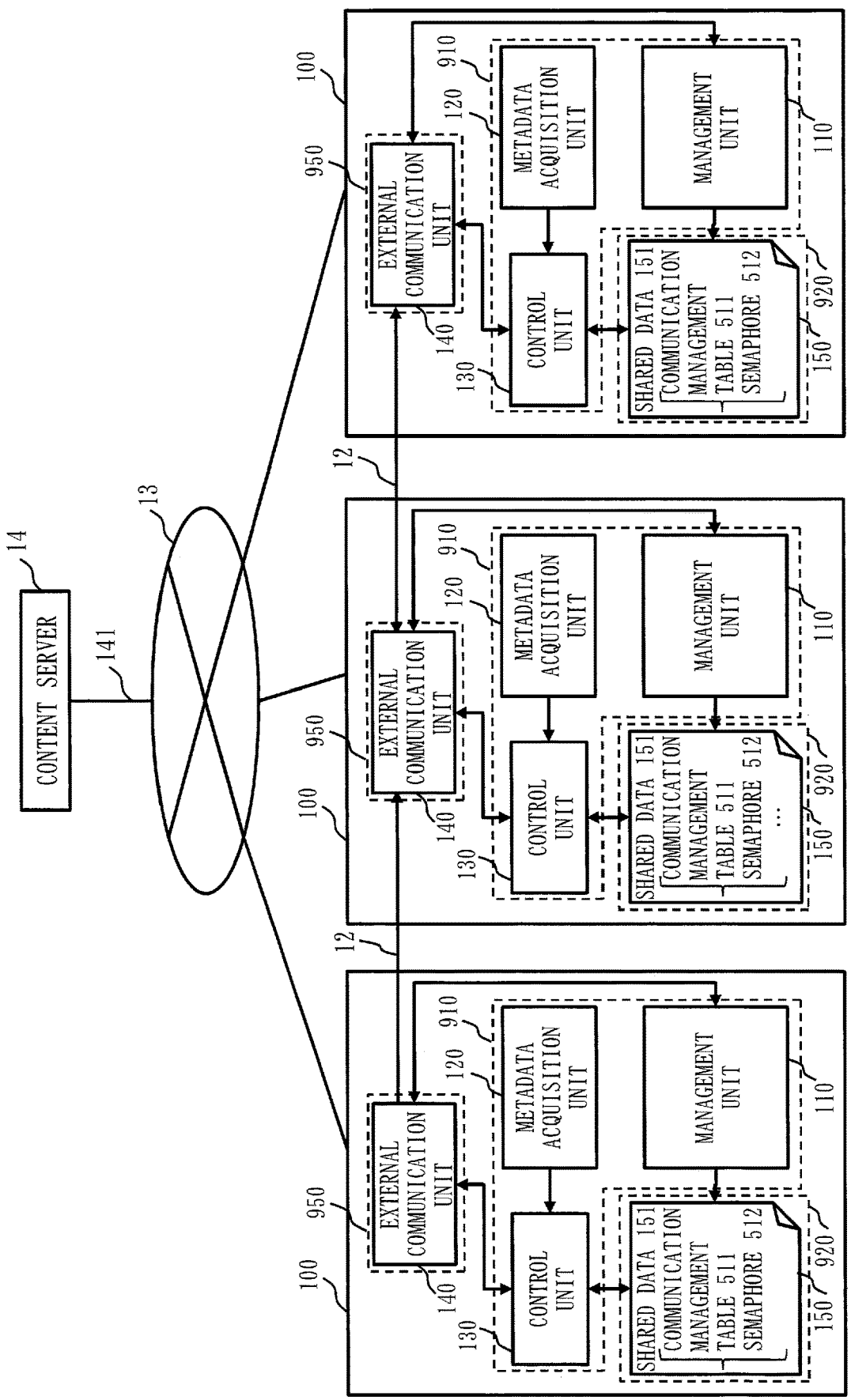
FIG. 2 is a configuration diagram of a communication control device according to the first embodiment.

As illustrated in FIG. 2, the mobile object 11 has the communication control device 100.

The communication control device 100 is a computer. The communication control device 100 includes a processor 910, and also includes other hardware components such as a storage device 920 and a communication device 950. The storage device 920 includes a memory and an auxiliary storage device. The processor 910 is connected with the other hardware components via signal lines and controls the other hardware components.

The communication control device 100 includes, as functional elements, a management unit 110, a metadata acquisition unit 120, a control unit 130, an external communication unit 140, and a storage unit 150. The storage unit 150 stores shared data 151. The shared data 151 includes a semaphore 512 and a communication management table 511.

The functions of the management unit 110, the metadata acquisition unit 120, and the control unit 130 are realized by software.

The external communication unit 140 is provided in the communication device 950.

The storage unit 150 is provided in the storage device 920.

The processor 910 is a device that executes a communication control program. The communication control program is a program for realizing the functions of the management unit 110, the metadata acquisition unit 120, and the control unit 130.

The processor 910 is an integrated circuit (IC) that performs arithmetic processing. Specific examples of the processor 910 are a CPU, a digital signal processor (DSP), and a graphics processing unit (GPU).

The memory is a storage device to temporarily store data. Specific examples of the memory are a static random access memory (SRAM) and a dynamic random access memory (DRAM).

The auxiliary storage device is a storage device to store data. A specific example of the auxiliary storage device is an HDD. Alternatively, the auxiliary storage device may be a portable storage medium such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The communication device 950 communicates with other devices via a network. The communication device 950 has a receiver and a transmitter. The communication device 950 is wirelessly connected to a communication network such as a LAN, the Internet, or a telephone line. Specifically, the communication device 950 is a communication chip or a network interface card (NIC). The communication control device 100 transmits and receives messages to and from the content server 14 via the communication device 950.

The communication control program is loaded into the processor 910 and executed by the processor 910. The memory stores not only the communication control program but also an operating system (OS). The processor 910 executes the communication control program while executing the OS. The communication control program and the OS may be stored in the auxiliary storage device. The communication control program and the OS stored in the auxiliary storage device are loaded into the memory and executed by the processor 910. Note that part or the entirety of the communication control program may be embedded in the OS.

The communication control device 100 may include a plurality of processors as an alternative to the processor 910. These processors share the execution of the communication control program. Each of the processors is, like the processor 910, a device that executes the communication control program.

Data, information, signal values, and variable values that are used, processed, or output by the communication control program are stored in the memory or the auxiliary storage device, or stored in a register or a cache memory in the processor 910.

The "unit" of each unit of the management unit 110, the metadata acquisition unit 120, and the control unit 130 may be interpreted as a "process", "procedure", or "step".

The communication control program causes a computer to execute each process, each procedure, or each step, where the "unit" of each of the above units is interpreted as the "process", "procedure", or "step". A communication control method is a method performed by the execution of the communication control program by the communication control device 100.

The communication control program may be stored and provided in a computer readable recording medium. Alternatively, the communication control program may be provided as a program product.

Note that the mobile object 11 includes an application execution unit that executes an application program for providing services to a user. In this embodiment, the application execution unit exists outside of the communication control device 100. Note that the application execution unit may exist in the communication control device 100.

\*\*\*Brief Description of Functions of Component Elements\*\*\*

The management unit 110 performs participation in and withdrawal from the management network 10, and also acquires, updates, and notifies the shared data 151. The management unit 110 is also referred to as a management-network management unit.

The shared data 151 is data to be shared between the mobile objects 11. The shared data 151 includes information such as the communication management table 511 and the semaphore 512. The shared data 151 is used for communication control by the control unit 130. The communication control includes exclusive control between the mobile objects. The communication control also includes transmission control of a delivery request for requesting delivery of content data. The communication control also includes time control of a processing time for acquiring content data. The semaphore 512 is used for exclusive control performed when each of the mobile objects acquires content data 141. The communication management table 511 is used for transmission control of the delivery request and time control of the processing time.

The communication management table 511 according to this embodiment will be described with reference to FIG. 3.

In the communication management table 511, a priority 515, a waiting time 516, and a maximum communication time 517 for acquiring content data are associated with one another. The priority 515 indicates a level of a request for data communication. The priority 515 is also referred to as a data communication request level.

The waiting time is assumed to be $Xn \leq \ldots \leq X1$. The maximum communication time is assumed to be $Y1 \leq \ldots \leq Yn$. By setting the waiting time and the maximum communication time in this way, the acquisition of a transmission right is facilitated for the mobile object whose priority 515 is high. The data download throughput of the mobile object whose priority 515 is high can also be increased. The maximum communication time may be replaced with the amount of download data.

The metadata acquisition unit 120 acquires metadata from the application execution unit that requires communication with the content server 14. Metadata is information indicating a characteristic of content data to be acquired from the content server. A specific example of metadata is information such as, for video, the amount of buffered data, or for map data, the remaining time to the use of the map data. These pieces of information may be estimated values. The metadata acquisition unit 120 may determine metadata based on the protocol of a data packet.

Figure 3:
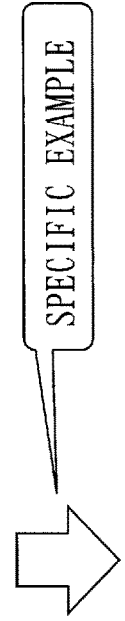
FIG. 3 is a configuration diagram of a communication management table according to the first embodiment.

FIG. 3 illustrates a specific example in which content data is video. The amount of pre-fetched data is acquired as metadata. The amount of pre-fetched data is the amount of downloaded data counted based on a playback point. In the specific example in FIG. 3, the communication management table 511 is set on the basis of the amount of pre-fetched data.

The control unit 130 controls the timing and communication time for downloading content data from the content server 14. The control unit 130 is also referred to as a communication control unit.

When the management unit 110 determines that the communication control is to be performed, the control unit 130 uses the semaphore 512 stored in the storage unit 150 to acquire the transmission right for transmitting to the content server 14 a delivery request to request delivery of content data. The control unit 130 acquires the content data by transmitting the delivery request. After acquiring the content data, the control unit 130 uses the semaphore 512 stored in the storage unit 150 to return the transmission right. When acquiring the transmission right or returning the transmission right, the control unit 130 transmits the semaphore 512 stored in the storage unit 150 to other mobile objects 11.

The external communication unit 140 performs encoding and decoding necessary for exchanging communication data over the network. The external communication unit 140 also communicates with other mobile objects 11 to exchange control data, using the ad hoc network 12. The external communication unit 140 also communicates with the base station 15 to download content data from the content server 14.

The storage unit 150 stores the semaphore 512 used for exclusive control. The storage unit 150 also stores the waiting time 516 of waiting for transmission of a delivery request and the maximum communication time 517, which is the maximum time of a processing time for acquiring content data. In this embodiment, the storage unit 150 stores the communication management table 511 in which the priority 515, the waiting time 516, and the maximum communication time 517 for acquiring content data are associated with one another.

*Description of Operation*

An overview of the overall flow of a communication control process S100 by the communication control device 100 according to this embodiment will be described with reference to FIG. 4.

<Management Process: Steps S110, S111, S112, and S116>

In step S110, upon receiving a request for connection to the content server 14, the management unit 110 performs a participation process to participate in the ad hoc network 12. Specifically, the management unit 110 performs the participation process when a request for connection to the content server 14 is generated by the application execution unit. At this time, the mobile objects that already constitute the management network 10 are to be other mobile objects. The other mobile objects constitute the management network 10, specifically, the ad hoc network 12 for communicating with each another.

The management unit 110 determines whether the communication control when acquiring content data is to be performed, based on the density of the mobile objects 11 in the management network 10. The management unit 110 determines whether the communication control is to be performed, using the number of the mobile objects 11 as the density of the mobile objects 11. That is, after successfully participating in the ad hoc network 12, the management unit 110 determines whether the communication control is to be performed, based on the number of the mobile objects 11. The determination as to whether the communication control is to be performed is done based on the number of the mobile objects 11, that is, whether the density of the mobile objects 11 is high.

In step S111, the management unit 110 determines whether the participation is successful and the number of mobile objects participating in the management network 10 is greater than or equal to a predetermined threshold. Note that a mobile object participating in the management network 10 is referred to as a participating mobile object. If the participation is not successful or the number of participating mobile objects is less than the threshold, the management unit 110 terminates the communication control process.

If the number of participating mobile objects is less than the threshold, the mobile object 11 downloads the content data by a regular process. This means that the communication control is not necessary, so that the mobile object 11 cancels the communication control process, and directly connects to the content server 14. After downloading the content data, the mobile object 11 withdraws from the management network 10 if it has participated in the management network 10.

If the participation is successful and the number of participating mobile objects is greater than or equal to the threshold, the process proceeds to step S112 to perform the communication control using exclusive control. The state in which the number of participating mobile objects is greater than or equal to the threshold is also described as "the density of the mobile objects is high".

In step S112, the management unit 110 acquires shared data. After successfully participating in the ad hoc network 12, the management unit 110 performs a shared data acquisition process to acquire the shared data 151 including the semaphore 512 and the communication management table 511 from one of the other mobile objects. If the shared data cannot be acquired from any of the other mobile objects, the management unit 110 generates the shared data and initializes the semaphore 512 and the communication management table 511 with predetermined values. The process of step S112 will be described in detail later.

<Metadata Acquisition Process: Step S113>

In step S113, the metadata acquisition unit 120 acquires metadata of communication data.

<Control process: Steps S114 and S115>

In step S114, the control unit 130 performs the communication control.

In step S115, the control unit 130 determines whether control data cannot be exchanged over the management network 10 or there is no longer any content delivery request. Specifically, a case in which the control data cannot be exchanged over the management network 10 is when the quality of ad hoc communication is poor. If the control data cannot be exchanged over the management network 10 or there is no longer any content delivery request, the process proceeds to step S116. If the control data can be exchanged over the management network 10 and there is a content delivery request, the process returns to step S112 and is repeated.

In step S116, the management unit 110 performs a withdrawal process to withdraw from the management network 10 and terminates the communication control process.

Figure 5:
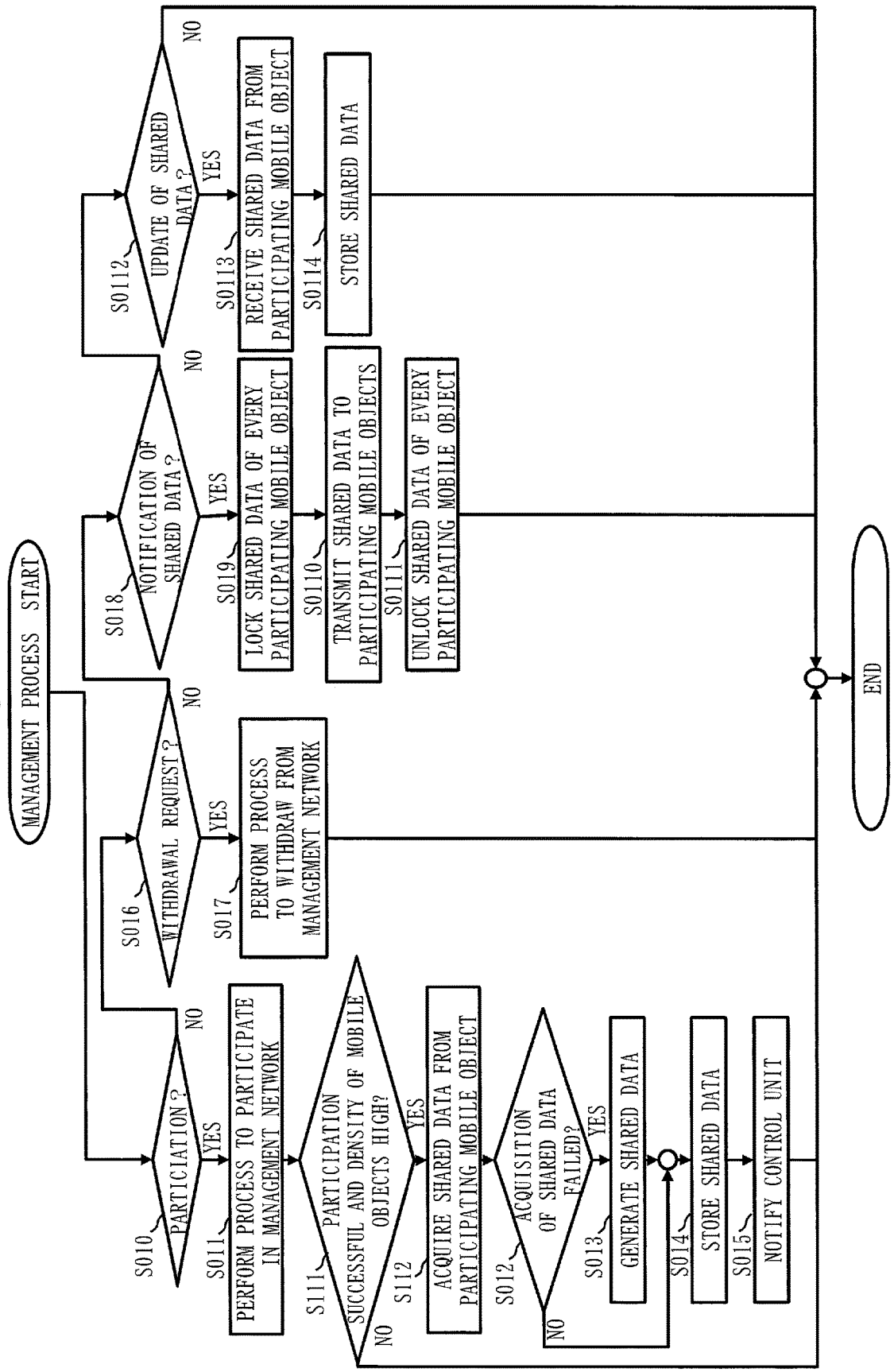
FIG. 5 is a flowchart of a management process according to the first embodiment.

The management process according to this embodiment will be described in detail with reference to FIG. 5.

Figure 4:
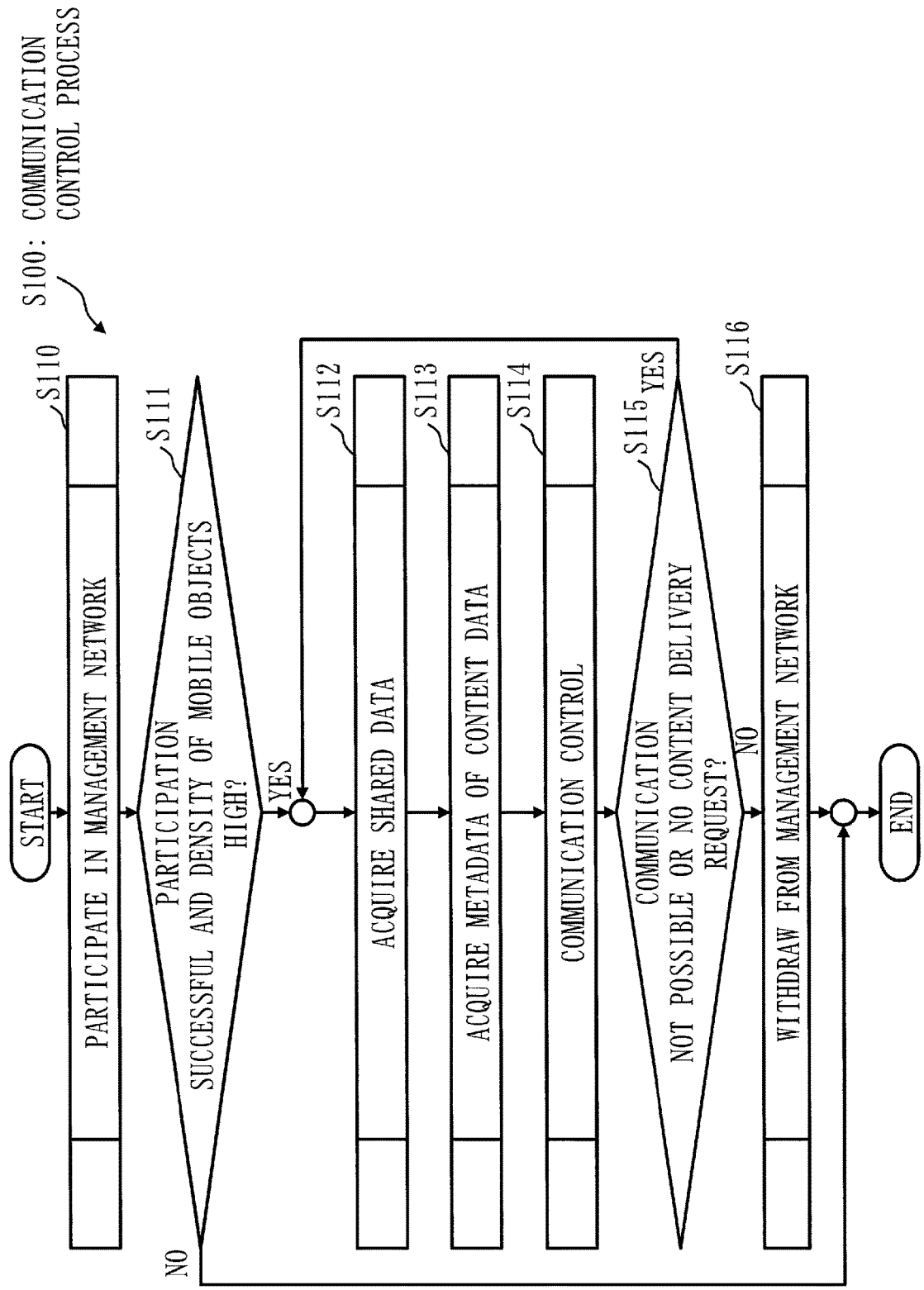
FIG. 4 is an overall flowchart of a communication control process by the communication control device according to the first embodiment.

In step S010, the management unit 110 determines whether there is a participation request by step S110 of FIG. 4. If there is a participation request, the process proceeds to step S011. If there is no participation request, the process proceeds to step S016.

In step S011, the management unit 110 performs a participation process to participate in the management network 10.

In step S111, the management unit 110 determines whether the participation is successful and the number of participating mobile objects is greater than or equal to the predetermined threshold. The process of step S111 is the same as the process of step S111 of FIG. 4.

In step S112, the management unit 110 attempts to acquire the shared data 151 from one of the participating mobile objects in the management network 10. The process of step S112 is the same as the process of step S112 of FIG. 4.

In step S012, the management unit 110 determines whether the acquisition of the shared data has failed. If none of the participating mobile objects has the shared data 151 and the acquisition of the shared data has failed, the management unit 110 proceeds to step S013. If the acquisition of the shared data is successful, the management unit 110 proceeds to step S014. Note that when the shared data cannot be acquired from any of the other mobile objects, the following two cases are conceivable. The first case is when the other mobile objects have participated in the management network but have never communicated with the content server. The second case is when the mobile object itself is a participating mobile object in the management network and is the first mobile object to communicate with the content server. In both of these cases, the shared data has not been generated, and thus needs to be generated.

In step S013, the management unit 110 newly generates shared data 151. The shared data 151 generated at this time is one in which the communication management table 511 and the semaphore 512 are initialized to predetermined values.

In step S014, the management unit 110 stores the acquired or generated shared data 151 in the storage unit 150.

In step S015, the management unit 110 notifies the control unit 130 that the shared data 151 has been stored in the storage unit 150.

In step S016, the management unit 110 determines whether there is a withdrawal request from the control unit 130. If there is a withdrawal request, the process proceeds to step S017. If there is no withdrawal request, the process proceeds to step S018.

In step S017, the management unit 110 performs a withdrawal process to withdraw from the management network 10.

In step S018, the management unit 110 determines whether there is a notification request from the control unit 130. If there is a notification request, the process proceeds to step S019. If there is no notification request, the process proceeds to step S0112. Note that the notification request is a request for notification of the shared data 151 by a semaphore P operation and a semaphore V operation by the control unit 130. The semaphore P operation is decrementing the semaphore of the shared data 151 and acquiring the transmission right. The semaphore V operation is incrementing the semaphore of the shared data 151 and returning the transmission right.

In step S019, the management unit 110 locks the shared data 151 of every participating mobile object. If the shared data 151 cannot be locked immediately, the management unit 110 waits until the shared data 151 can be locked.

In step S0110, the management unit 110 transmits the shared data 151 to the participating mobile objects.

Then, in step S0111, the management unit 110 unlocks the shared data 151 of every participating mobile object.

Note that when a request for acquisition of the shared data 151 of step S112 is received from one of the other mobile objects, a process to respond to this acquisition request is substantially the same as the process described above. However, the acquired or generated shared data is transmitted to only the mobile object that has requested the acquisition.

In step S0112, the management unit 110 of each mobile object determines whether the shared data 151 is to be updated. Upon receiving the shared data 151 transmitted in step S0110 in one of the other mobile objects, the management unit 110 of each mobile object determines that the shared data 151 is to be updated. If it is determined that the shared data 151 is to be updated, the process proceeds to step S0113. If the shared data 151 is not to be updated, the process is terminated.

In step S0113, the management unit 110 receives the shared data transmitted from one of the other mobile objects.

In step S0114, the management unit 110 stores the received shared data in the storage unit 150. That is, the management unit 110 updates the semaphore 512 stored in the storage unit 150 with the semaphore received from one of the other mobile objects.

However, when the number of participating mobile objects is one, after generating the communication management table 511, the management unit 110 communicates with the content server 14 without the semaphore operations of the communication control by the control unit 130 being performed. When the number of participating mobile objects is two or more, the semaphore operations are performed. The semaphore operations of the communication control by the control unit 130 are the processes of steps S302 and S304 of FIG. 7.

Figure 6:
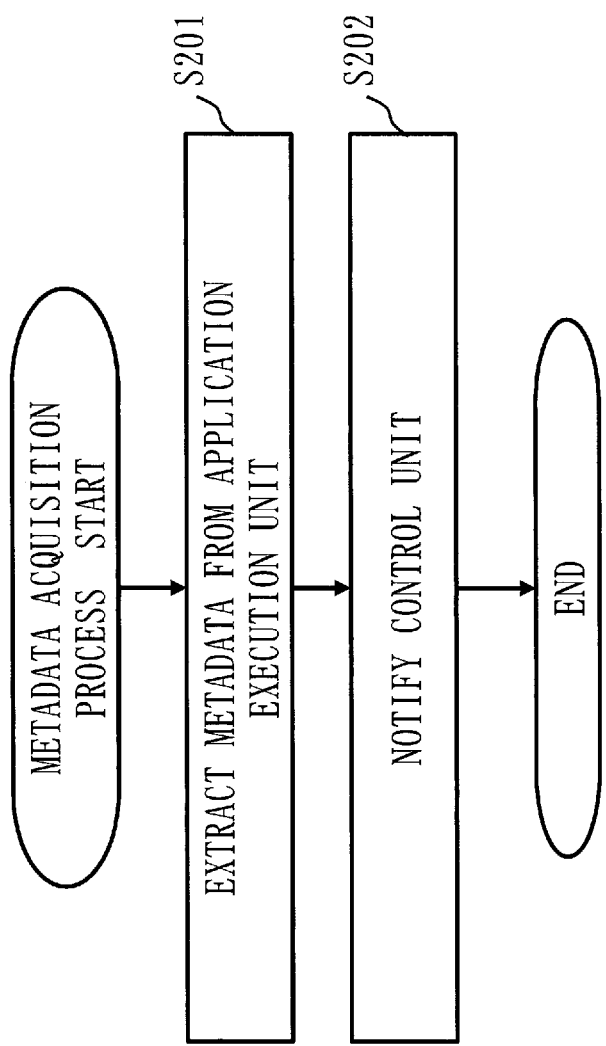
FIG. 6 is a flowchart of a metadata acquisition process according to the first embodiment.

The metadata acquisition process according to this embodiment will now be described in detail with reference to FIG. 6.

In step S201, upon receiving a metadata acquisition request from the control unit 130, the metadata acquisition unit 120 extracts metadata from the application execution unit.

In step S202, the metadata acquisition unit 120 notifies the control unit 130 of the metadata extracted from the application execution unit.

The control process according to this embodiment will now be described in detail with reference to FIG. 7.

In step S300, the control unit 130 acquires the metadata from the metadata acquisition unit 120. The control unit 130 calculates the priority 515 based on the metadata.

In step S301, the control unit 130 refers to the waiting time corresponding to the priority 515 in the communication management table 511, and waits for the duration of this time. As a specific example, when the priority 515 is 2, the waiting time is X2. The control unit 130 acquires the transmission right in step S302 after the waiting time has elapsed after the management unit 110 has determined that exclusive control is to be performed.

In step S302, the control unit 130 performs the semaphore P operation to decrement the semaphore of the shared data 151 and acquire the transmission right. The shared data notification process by the management unit 110, that is, step S018 of FIG. 5 is performed for the participating mobile objects (other mobile objects) in the management network 10. Upon receiving the shared data 151 by the shared data notification process, each participating mobile object performs a shared data update process by the management unit 110 (step S0112). Then, each participating mobile object replaces its own shared data 151 with the received shared data. If the semaphore P operation is successful, the process proceeds to step S303. If the semaphore P operation is not successful, the process proceeds to step S305.

In step S303, the control unit 130 acquires content data within the limit of the maximum communication time corresponding to the calculated priority. Specifically, the control unit 130 refers to the maximum communication time corresponding to the priority 515 obtained in step S300 in the communication management table 511. Then, the control unit 130 downloads the content data from the content server 14 for the duration of time the upper limit of which is the maximum communication time. As a specific example, when the priority 515 is 2, the maximum communication time is Y2.

After the download, the control unit 130 performs the semaphore V operation in step S304 to increment the semaphore of the shared data 151 and return the transmission right. The shared data notification process by the management unit 110, that is, step S018 of FIG. 5 is performed for the participating mobile objects (other mobile objects) in the management network 10. Upon receiving the shared data 151 by the shared data notification process, each participating mobile object performs the shared data update process by the management unit 110 (step S0112). Each participating mobile object replaces its own shared data 151 with the received shared data. If the semaphore V operation is successful, the process proceeds to step S115. If the semaphore V operation is not successful, the process proceeds to step S305.

The process of step S115 is the process of step S115 of FIG. 4.

In step S305, if the semaphore V operation is successful and there is no content delivery request from the application execution unit, or if the semaphore P or V operation is not successful, the control unit 130 makes a request for the withdrawal process to the management unit 110. If the semaphore P operation is successful and there is a succeeding content delivery request from the application execution unit, the process is performed again from step S300.

*Description of Effects of this Embodiment*

In the communication control device 100 according to this embodiment, an ad hoc network is constructed between the mobile objects that are in proximity to each other, and the timing to connect to the content server and the amount of download are autonomously adjusted. Therefore, the communication control device 100 according to this embodiment can minimize deterioration of the quality of service at an application level.

The communication control device 100 according to this embodiment waits for the duration of the waiting time based on the priority before acquiring the transmission right. Therefore, the communication control device 100 according to this embodiment facilitates acquirement of the transmission right for the mobile object whose content delivery request level is high.

The communication control device 100 according to this embodiment uses a distributed transaction such as a semaphore to limit the number of mobile objects that can simultaneously transmit a content delivery request, that is, the maximum number of transmission rights that can be issued. Therefore, the communication control device 100 according to this embodiment can perform the communication control adapted to available network bandwidth.

The communication control device 100 according to this embodiment determines whether the communication control is needed based on whether an ad hoc network can be constructed or the threshold for the number of participating mobile objects. Therefore, the communication control device 100 according to this embodiment can implement the control only in an area where the communication control is required, so that processing load is reduced.

The communication control device 100 according to this embodiment eliminates the need for installment of a center server in principle, so that maintenance and running costs are reduced.

*Other Configurations*

<First Variation>

In this embodiment, the communication control is implemented only in an area where the communication control is required. However, the initial value of the semaphore or the details in the communication management table may be dynamically adjusted based on results of monitoring communication traffic. That is, the management unit monitors the communication traffic between the mobile objects. Then, the management unit may dynamically set the waiting time and the maximum communication time based on the results of monitoring.

This allows highly adaptive communication control depending on the communication status of the base station.

<Second Variation>

In this embodiment, the communication control is implemented only in an area where the communication control is required. However, in order to prevent synchronization between the mobile objects when acquiring the transmission right, a random value may be added to the waiting time set in the communication management table. That is, the control unit may be adapted to acquire the transmission right after the time that is the sum of the waiting time and the random value has elapsed after the management unit has determined that exclusive control is to be used. Specifically, in step S301 of the control process of FIG. 7, the control unit 130 may add a random value δ such that $0<δ<1$ to the waiting time and wait for the duration of the waiting time with the added δ.

This allows the waiting times to be varied between the mobile objects, so that synchronization between the mobile objects when acquiring the transmission right can be prevented. Therefore, a lock waiting time can be reduced in the semaphore P operation in step S302 of the control process of FIG. 7.

<Third Variation>

In this embodiment, the communication control is implemented only in an area where the communication control is required. However, the shared data may include authentication information for authenticating mobile objects participating in the management network. The management unit may use the authentication information included in the shared data to authenticate a mobile object that is going to newly participate in the management network. Specifically, the authentication information required for authenticating mobile objects is written in the shared data, so as to authenticate a mobile object that is going to newly participate in the ad hoc network. Specifically, the authentication information required for authenticating mobile objects is data such as digital certificates of mobile objects to communicate with each other or a list of user names and hash values of passwords.

This allows only authorized mobile objects to use services, so that unauthorized use can be prevented.

<Fourth Variation>

In this embodiment, the communication control is implemented only in an area where the communication control is required. However, a content server to which each mobile object is to be connected may be limited. Limiting the content server to which each mobile object is to be connected means that the Internet Protocol (IP) address of a content server to which connection is allowed, out of a plurality of content servers, is specified for each of the mobile objects. Usually, the content server to be a communication destination of a mobile object may vary. However, limiting the communication destination to a particular content server is equivalent to performing, in the mobile object, a connection allocation process such that the upper limit is the maximum number of simultaneous connections, which is usually performed in the content server. Limiting the communication destination to a particular content server is limiting the communication destination to the server having the same IP address. In the connection allocation process, load distribution or connection priority control is performed. Therefore, a load distribution process or control of the maximum number of connections, normally performed in the content server, can be performed in the mobile object.

This results in distribution of the timings of requests for content data to the content server, so that the load on the content server can be leveled, and required peak performance can be reduced. As a result, reduction in cost of the content server can be expected.

<Fifth Variation>

The communication control device 100 may include an input interface and an output interface. The input interface is a port to be connected with an input device such as a mouse, a keyboard, or a touch panel. Specifically, the input interface is a Universal Serial Bus (USB) terminal. Note that the input interface may be a port to be connected with a LAN.

The output interface is a port to which a cable of an output device, such as a display, is connected. Specifically, the output interface is a USB terminal or a High Definition Multimedia Interface (HDMI, registered trademark) terminal. Specifically, the display is a liquid crystal display (LCD).

<Sixth Variation>

In this embodiment, the functions of the management unit 110, the metadata acquisition unit 120, and the control unit 130 are realized by software. As a variation, the functions of the management unit 110, the metadata acquisition unit 120, and the control unit 130 may be realized by hardware.

Figure 8:
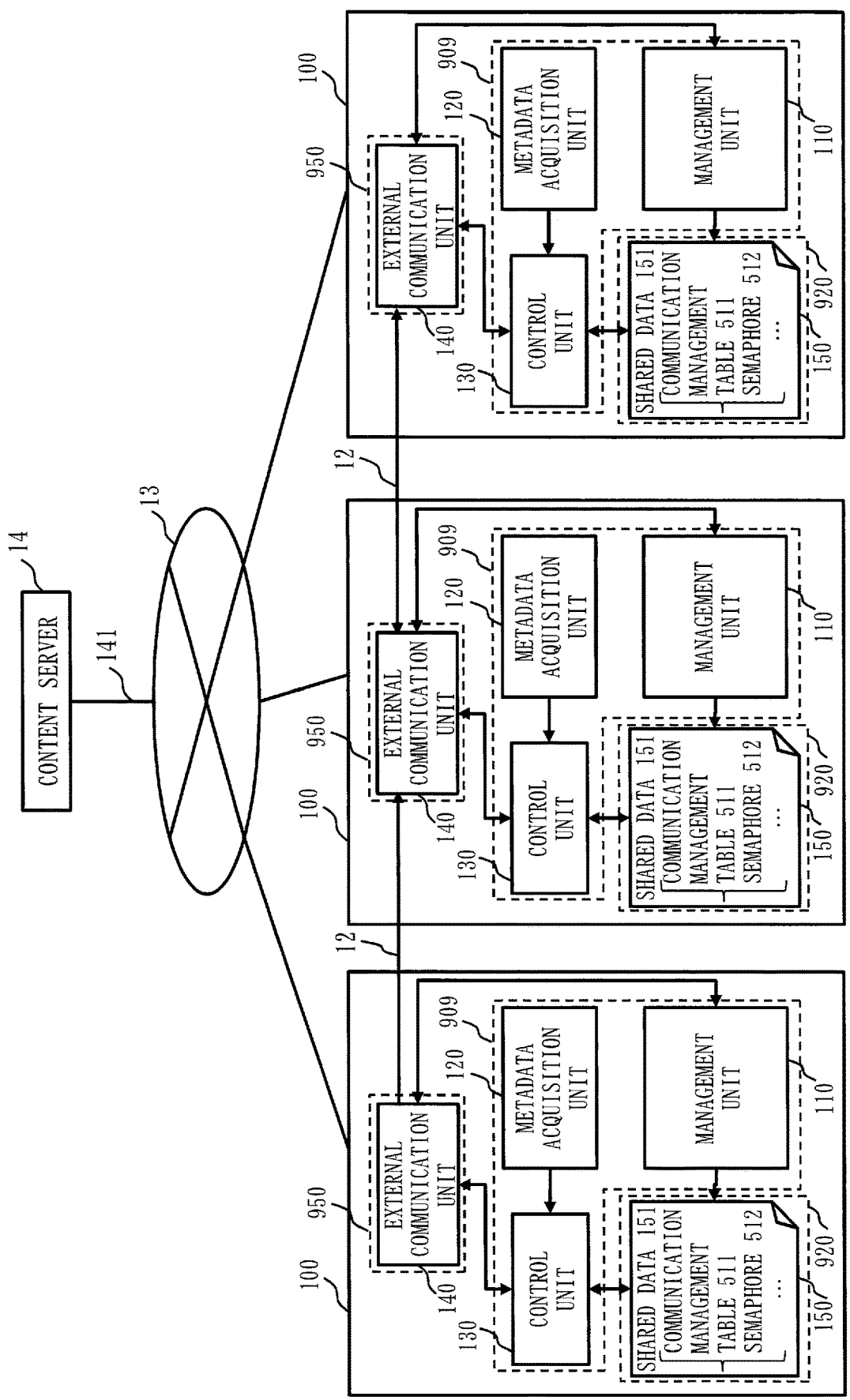
FIG. 8 is a configuration diagram of the communication control device according to a variation of the first embodiment.

FIG. 8 is a diagram illustrating a configuration of the communication control device 100 according to a variation of this embodiment.

The communication control device 100 includes an electronic circuit 909, the storage device 920, and the communication device 950.

The electronic circuit 909 is a dedicated electronic circuit that realizes the functions of the management unit 110, the metadata acquisition unit 120, and the control unit 130.

Specifically, the electronic circuit 909 is a single circuit, a composite circuit, a programmed processor, a parallel-programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the management unit 110, the metadata acquisition unit 120, and the control unit 130 may be realized by one electronic circuit, or may be distributed among and realized by a plurality of electronic circuits.

As another variation, some of the functions of the management unit 110, the metadata acquisition unit 120, and the control unit 130 may be realized by the electronic circuit, and the rest of the functions may be realized by software.

The shared data 151 may be stored in the memory or the auxiliary storage device of the storage device 920, or may be stored in dedicated hardware.

Each of the processor and the electronic circuit is also referred to as processing circuitry. That is, in the communication control device 100, the functions of the management unit 110, the metadata acquisition unit 120, and the control unit 130 are realized by the processing circuitry.

In the communication control device 100, the "unit" of each of the management unit, the metadata acquisition unit, the control unit, and the storage unit may be interpreted as a "step" or "process". The "process" in each of the management process, the data acquisition process, the control process, and the storage process may be interpreted as a "program", "program product", or "computer readable storage medium recording a program".

Second Embodiment

Differences from the first embodiment will be described in this embodiment.

Note that in this embodiment, components that are the same as those in the first embodiment are denoted by the same reference sings and description of these components will be omitted.

In this embodiment, an embodiment in which the management network 10 is used for caching of content data will be described.

*Description of Configuration*

Figure 9:
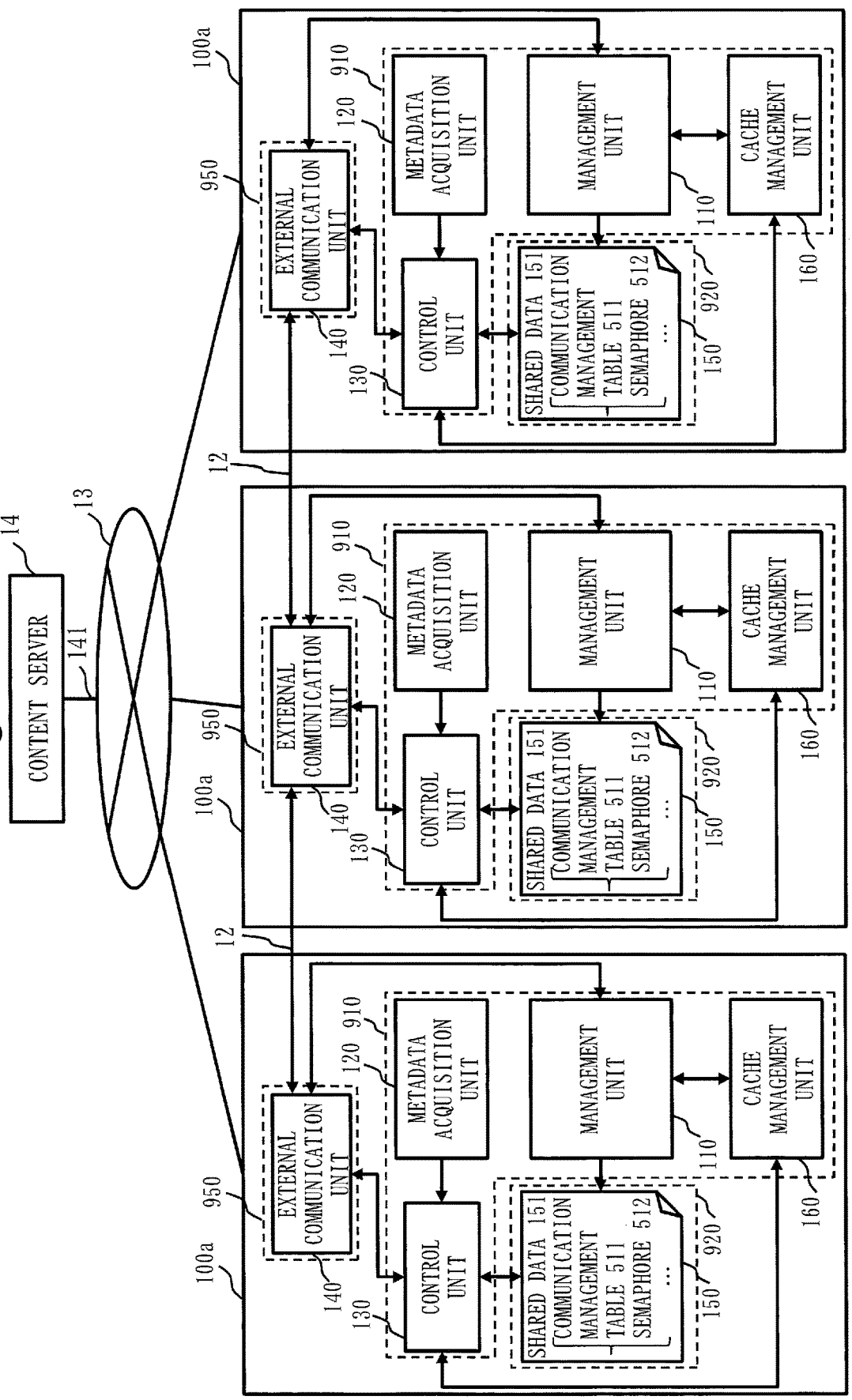
FIG. 9 is a configuration diagram of a communication control device according to a second embodiment.

A configuration of a communication control device 100a according to this embodiment will be described with reference to FIG. 9.

The communication control device 100a includes a cache management unit 160 in addition to the functional elements of the communication control device 100 described with reference to FIG. 2. The cache management unit 160 may be implemented by the processor 910 or may be implemented by dedicated hardware, as in the first embodiment.

The cache management unit 160 acquires a file name of content data from metadata, and uses the file name to search for a cached file in the mobile objects. If the cached file cannot be acquired from any of the mobile objects, the cache management unit 160 publishes content data acquired from the content server to the mobile objects as cached data. The cache management unit 160 searches for or acquires cached data, based on a request from the control unit 130. The cache management unit 160 publishes a file downloaded from the content server 14 as cached data if publication is allowed for the file. That is, the cache management unit 160 permits search or acquisition of cached data from other mobile objects.

*Description of Operation*

Figure 10:
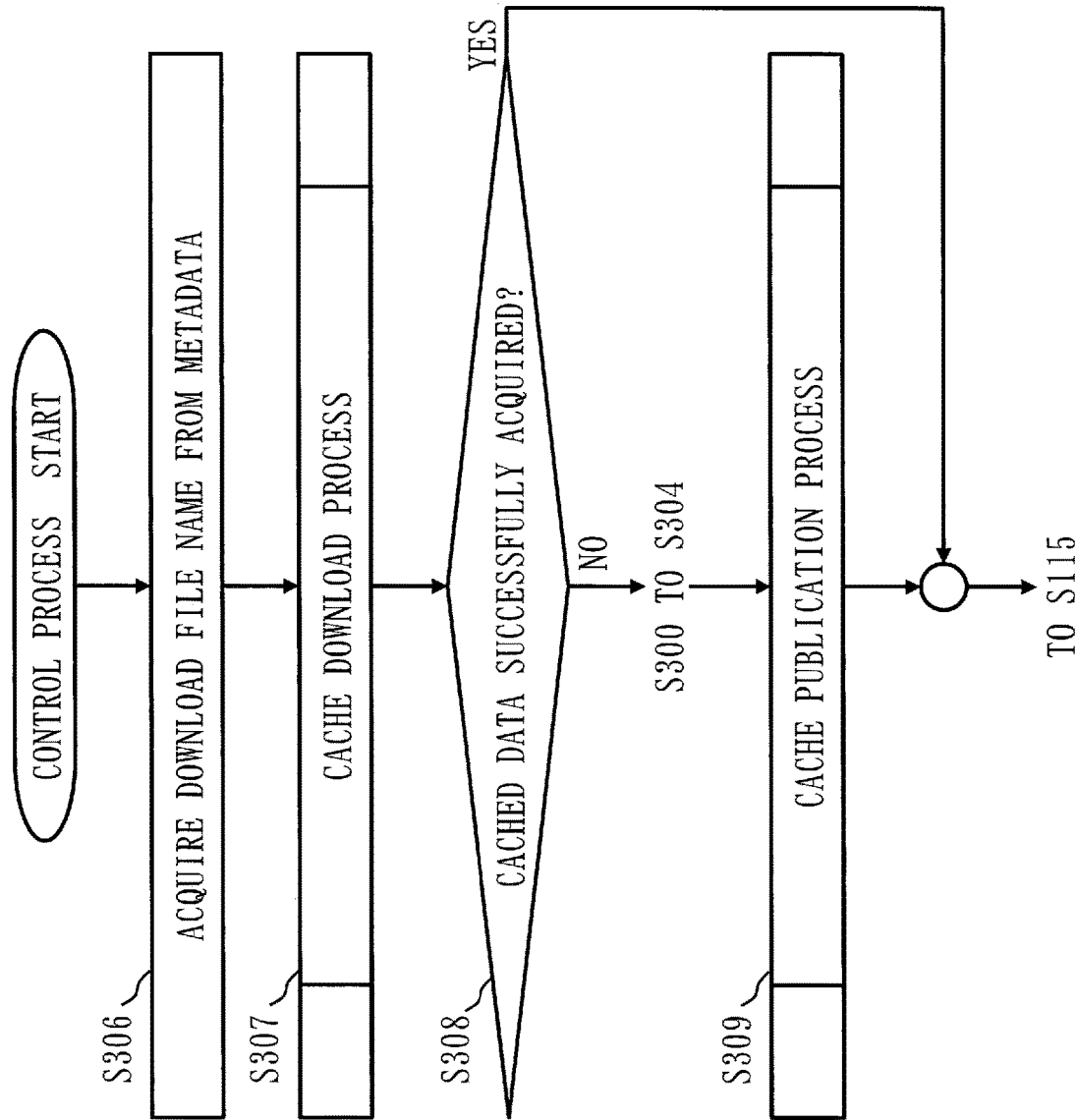
FIG. 10 is a flowchart of a control process according to the second embodiment.

FIG. 10 is a flowchart illustrating a control process according to this embodiment. FIG. 11 is a flowchart illustrating a cache management process according to this embodiment. For convenience of description, FIG. 10 illustrates only differences from the control process of FIG. 7 described in the first embodiment.

Figure 7:
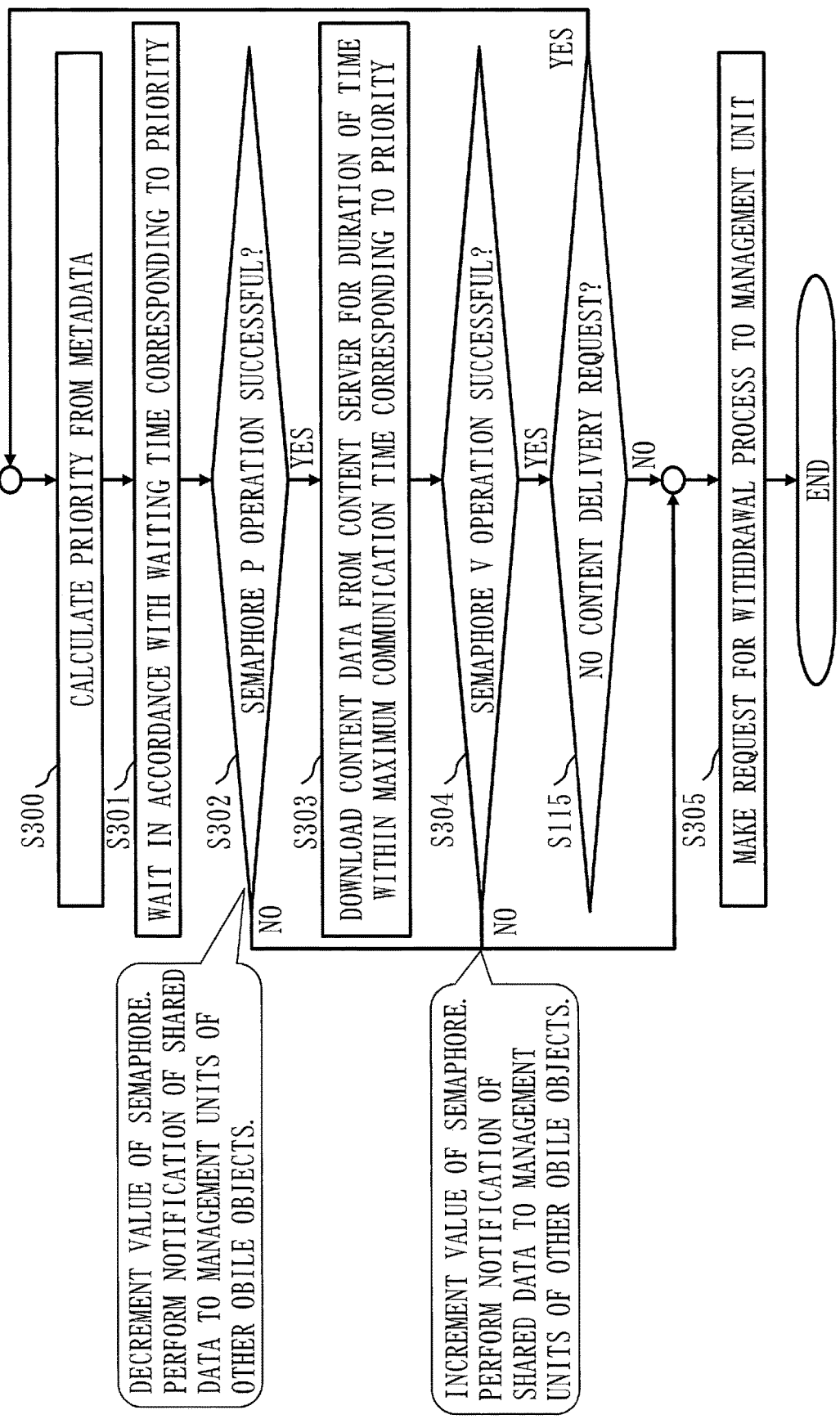
FIG. 7 is a flowchart of a control process according to the first embodiment.

Steps S306 and S307 are processes that are performed before step S300 in the control process of FIG. 7. In step S306, the control unit 130 acquires metadata from the metadata acquisition unit 120, and acquires from the metadata a file name for download.

In step S307, the control unit 130 makes a request to the cache management unit 160 for a cache download process to download cached data based on the acquired file name for download.

In step S308, it is determined whether the download of the cached data is successful.

If the download of the cached data is successful, the control unit 130 proceeds to perform step S115 of the control process of FIG. 7 to check whether there is a content delivery request. If the download of the cached data is not successful, the control unit 130 performs steps S300 to S304 of the control process of FIG. 7 to download the content data or part of the content data from the content server 14.

Then, in step S309, the control unit 130 makes a request to the cache management unit 160 for a cache publication process to publish the content data as cached data. Then, the control unit 130 proceeds to perform step 115 of the control process of FIG. 7 to check whether there is a content delivery request.

The cache management process according to this embodiment will now be described in detail with reference to FIG. 11. The cache management process by the cache management unit 160 includes the cache download process and the cache publication process.

<Cache Download Process>

In step S400, the cache management unit 160 receives a request from the control unit 130 for download of cached data.

In step S401, the cache management unit 160 performs a search for a cached file in the participating mobile objects on the management network 10.

In step S402, the cache management unit 160 determines whether there is a mobile object that has the cached file. If there is a mobile object that has the cached file, the process proceeds to step S403. If there is no mobile object that has the cached file, the process is terminated.

In step S403, the cache management unit 160 downloads the cached file and terminates the process.

<Cache Publication Process>

In step S404, the cache management unit 160 receives from the control unit 130 a request for publication of cached data.

In step S405, the cache management unit 160 determines whether publication is allowed for the cached data. If publication is allowed, the process proceeds to step S406. If publication is not allowed, the process is terminated.

In step S406, the cache management unit 160 publishes the cached data to the participating mobile objects on the management network 10.

Criteria used to determine whether publication is allowed include whether personal information is included, whether copyright protection is applied, and whether publication is limited. An inquiry using a pop-up may be made to the user as to whether to allow publication at each timing of publishing cached data.

Note that publication refers to a "state in which download from another mobile object is allowed". The mobile object that wishes to have content data makes an inquiry to other participating mobile objects, using index information of the desired content data. If there is a participating mobile object that has the desired content data, the mobile object that wishes to have the content data directly communicates with this participating mobile object to download the content data. The index information may be information such as an identifier of the content data or a file name of the content data.

*Description of Effects of this Embodiment*

The communication control device 100a according to this embodiment performs caching of content data between the mobile objects that are in proximity to each other. Therefore, the communication control device 100a according to this embodiment can be spared from the work of downloading content data or part of the content data from the content server. In particular, with regard to firmware update and delivery of data such as map data and advertisement data for the purpose of spreading information, the load on the content server can be reduced and fast download can be realized. In addition, by appropriately setting the criteria for allowing publication as cached data, both security and caching can be achieved.

*Other Configurations*

<Seventh Variation>

In this embodiment, caching of content data is performed between the mobile objects that are in proximity to each other. Usually, when the ad hoc network, which is the management network, disappears, cached data also disappears. However, the cache management unit may temporarily save the cached data to a base station or a roadside device when the management network disappears. Then, the cache management unit may receive the cached data from the base station or the roadside device and re-publish the cached data when the management network is re-configured.

This can increase the probability of a cache hit.

<Eighth Variation>

In the first and second embodiments above, the ad hoc network is used as the management network. However, a network such as the Internet, a mobile phone network, or a wide area wireless LAN may be used as the management network temporarily or permanently.

This can prevent a breakdown of the communication control system due to temporary fluctuations in the quality of communication, which is typical of the ad hoc network.

In the first and second embodiments above, each unit of the communication control device is described as an independent functional block. However, the configuration of the communication control device is not limited to the configurations as described in the above embodiments. The functional blocks of the communication control device may be implemented in any configuration, provided that the functions described in the above embodiments can be realized.

Portions of the first and second embodiments described above may be implemented in combination. Alternatively, one portion of these embodiments may be implemented. Alternatively, these embodiments may be implemented as a whole or partially in any combination.

Note that the above-described embodiments are essentially preferred examples, and are not intended to limit the scope of the present invention, the scope of applications of the present invention, and the scope of intended uses of the present invention. Various modifications can be made to the above-described embodiments as necessary.

REFERENCE SIGNS LIST

10: management network; 11: mobile object; 12: ad hoc network; 13: wide area network; 14: content server; 15: base station; 141: content data; 100, 100a: communication control device; 110: management unit; 120: metadata acquisition unit; 130: control unit; 140: external communication unit; 150: storage unit; 151: shared data; 511: communication management table; 512: semaphore; 515: priority; 516: waiting time; 517: maximum communication time; 500: communication control system; 160: cache management unit; 909: electronic circuit; 910: processor; 920: storage device; 950: communication device; S100: communication control process

The invention claimed is:

1. A communication control device installed in each of mobile objects that constitute a management network for communicating with each other, the mobile objects acquiring content data from a content server, the communication control device comprising:
processing circuitry to determine whether communication control when acquiring the content data is to be performed, based on a density of the mobile objects in the management network, the communication control including exclusive control between the mobile objects; and
a memory to store a semaphore used for the exclusive control between the mobile objects,
wherein when it is determined that the communication control is to be performed, the processing circuitry uses the semaphore stored in the memory to acquire a transmission right for transmitting to the content server a delivery request to request delivery of the content data, acquires the content data by transmitting the delivery request, and after acquiring the content data, uses the semaphore stored in the memory to return the transmission right.

2. The communication control device according to claim 1,
wherein the communication control includes transmission control of a delivery request to request delivery of the content data,
wherein the memory stores a waiting time of waiting for transmission of the delivery request, the waiting time being used for the transmission control of the delivery request, and
wherein the processing circuitry acquires the transmission right after the waiting time has elapsed after it has been determined that the communication control is to be performed.

3. The communication control device according to claim 1,
wherein the communication control includes time control of a processing time for acquiring the content data,
wherein the memory stores a maximum communication time, which is a maximum time of the processing time for acquiring the content data, the maximum communication time being used for the time control of the processing time, and
wherein the processing circuitry acquires the content data within a limit of the maximum communication time when it is determined that the communication control is to be performed.

4. The communication control device according to claim 3,
wherein the memory stores a communication management table in which a priority, a waiting time, and the maximum communication time for acquiring the content data are associated with one another, the waiting time being a time of waiting for transmission of the delivery request and being used for transmission control of the delivery request, and
wherein the processing circuitry calculates a priority based on metadata indicating a characteristic of content data to be acquired from the content server, acquires the transmission right after the waiting time corresponding to the calculated priority has elapsed, and acquires the content data within a limit of the maximum communication time corresponding to the calculated priority.

5. The communication control device according to claim 1,
wherein the processing circuitry transmits the semaphore stored in the memory to another or other mobile objects of the mobile objects when acquiring the transmission right or returning the transmission right, and
wherein the processing circuitry updates the semaphore stored in the memory with a semaphore received from another mobile object of the mobile objects.

6. The communication control device according to claim 1,
wherein upon receiving a request for connection to the content server, the processing circuitry performs a participation process to participate in the management network, and when participation in the management network is successful, determines whether the communication control is to be performed, based on the density of the mobile objects.

7. The communication control device according to claim 1,
wherein the processing circuitry determines whether the communication control is to be performed, using the number of the mobile objects as the density of the mobile objects.

8. The communication control device according to claim 4,
wherein when participation in the management network is successful, the processing circuitry performs a shared data acquisition process to acquire shared data including the semaphore and the communication management table from another mobile object of the mobile objects, and when the shared data cannot be acquired from any of the mobile objects, newly generates shared data, and transmits the newly generated shared data to another or other mobile objects of the mobile objects.

9. The communication control device according to claim 4,
wherein the processing circuitry monitors communication traffic between the mobile objects, and sets the waiting time and the maximum communication time based on a result of monitoring.

10. The communication control device according to claim 2,
wherein when it is determined that the exclusive control is to be used, the processing circuitry acquires the transmission right after a time that is a sum of the waiting time and a random value has elapsed after it has been determined that the exclusive control is to be used.

11. The communication control device according to claim 8,
wherein the shared data includes authentication information for authenticating a mobile object that is going to participate in the management network, and
wherein the processing circuitry uses the authentication information included in the shared data to authenticate a mobile object that is going to newly participate in the management network.

12. The communication control device according to claim 4,
wherein the processing circuitry acquires a file name of the content data from the metadata, and uses the file name to search for a cached file in the mobile objects.

13. The communication control device according to claim 12,
wherein when the cached file cannot be acquired from at least one of the mobile objects, the processing circuitry publishes content data acquired from the content server to the mobile objects as cached data.

14. The communication control device according to claim 12,
wherein the processing circuitry temporarily saves cached data to a base station or a roadside device when the management network disappears, and receives the cached data from the base station or the roadside device and re-publishes the cached data when the management network is re-configured.

15. The communication control device according to claim 1,
wherein the management network includes an ad hoc network, the Internet, a mobile phone network, or a wide area wireless local area network (LAN).

16. The communication control device according to claim 1,
wherein for each of the mobile objects, an Internet Protocol (IP) address of a content server to which connection is allowed, out of a plurality of content servers, is determined.

17. A communication control method of a communication control device installed in each of mobile objects that constitute a management network for communicating with each other, the mobile objects acquiring content data from a content server, the communication control method comprising:
determining whether communication control when acquiring the content data is to be performed, based on a density of the mobile objects in the management network, the communication control including exclusive control between the mobile objects;
storing a semaphore used for the exclusive control between the mobile objects in a memory; and
using, when it is determined that the communication control is to be performed, the semaphore stored in the memory to acquire a transmission right for transmitting to the content server a delivery request to request delivery of the content data, acquiring the content data by transmitting the delivery request, and after acquiring the content data, using the semaphore stored in the memory to return the transmission right.

18. A non-transitory computer readable medium storing a communication control program of a communication control device installed in each of mobile objects that constitute a management network for communicating with each other, the mobile objects acquiring content data from a content server, the communication control program causing a computer to execute:
a communication control process to determine whether communication control when acquiring the content data is to be performed, based on a density of the mobile objects in the management network, the communication control including exclusive control between the mobile objects;
a storage process to store a semaphore used for the exclusive control between the mobile objects; and
a control process to, when it is determined that the communication control is to be performed, use the semaphore stored by the storage process to acquire a transmission right for transmitting to the content server a delivery request to request delivery of the content data, acquire the content data by transmitting the delivery request, and after acquiring the content data, use the semaphore stored by the storage process to return the transmission right.

* * * * *